No. 886,275. PATENTED APR. 28, 1908.
I. O. THORLEY.
ADVERTISING DEVICE.
APPLICATION FILED DEC. 15, 1906.
2 SHEETS—SHEET 2.
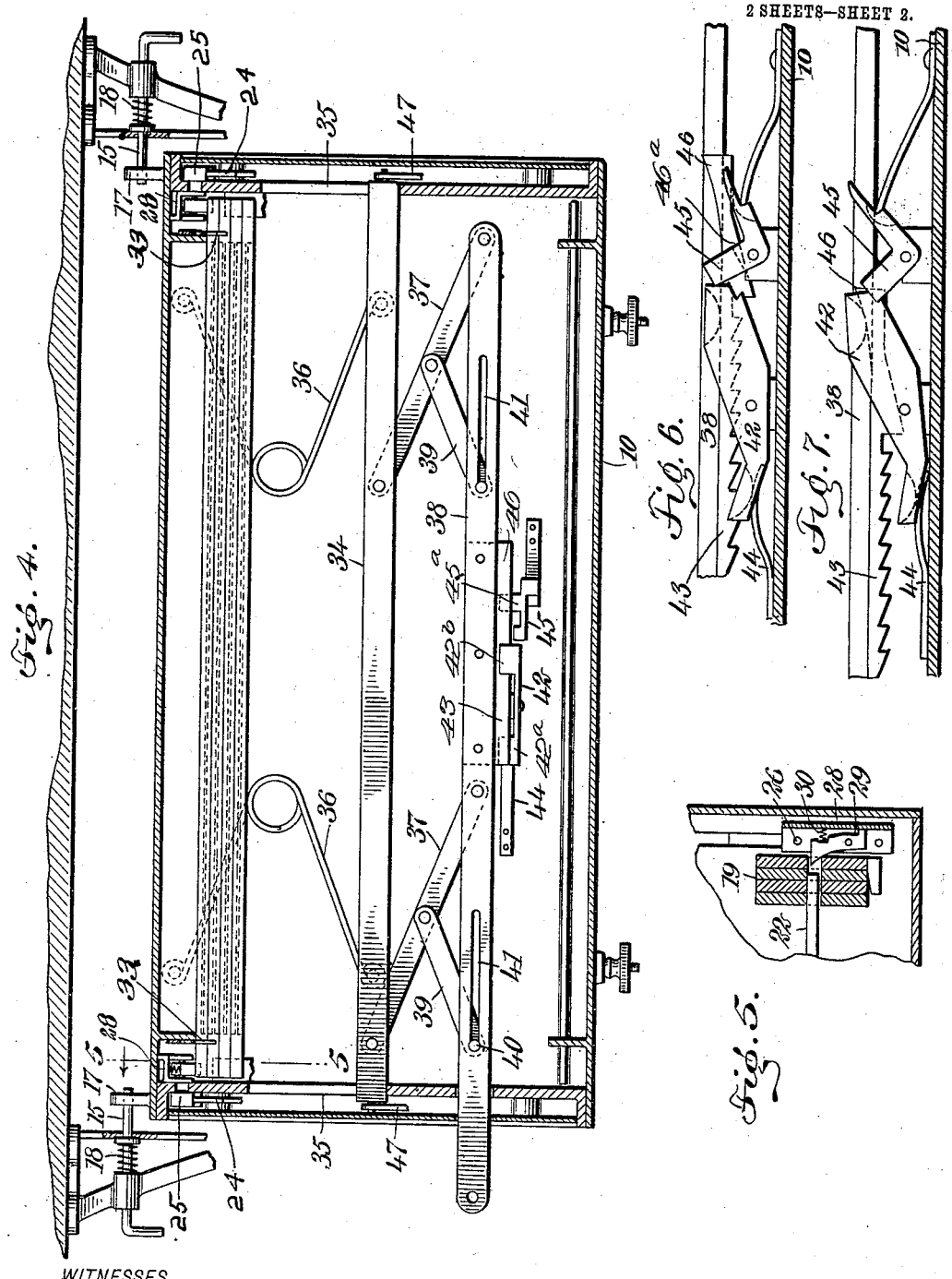
WITNESSES
INVENTOR
Ira O. Thorley
BY
ATTORNEYS

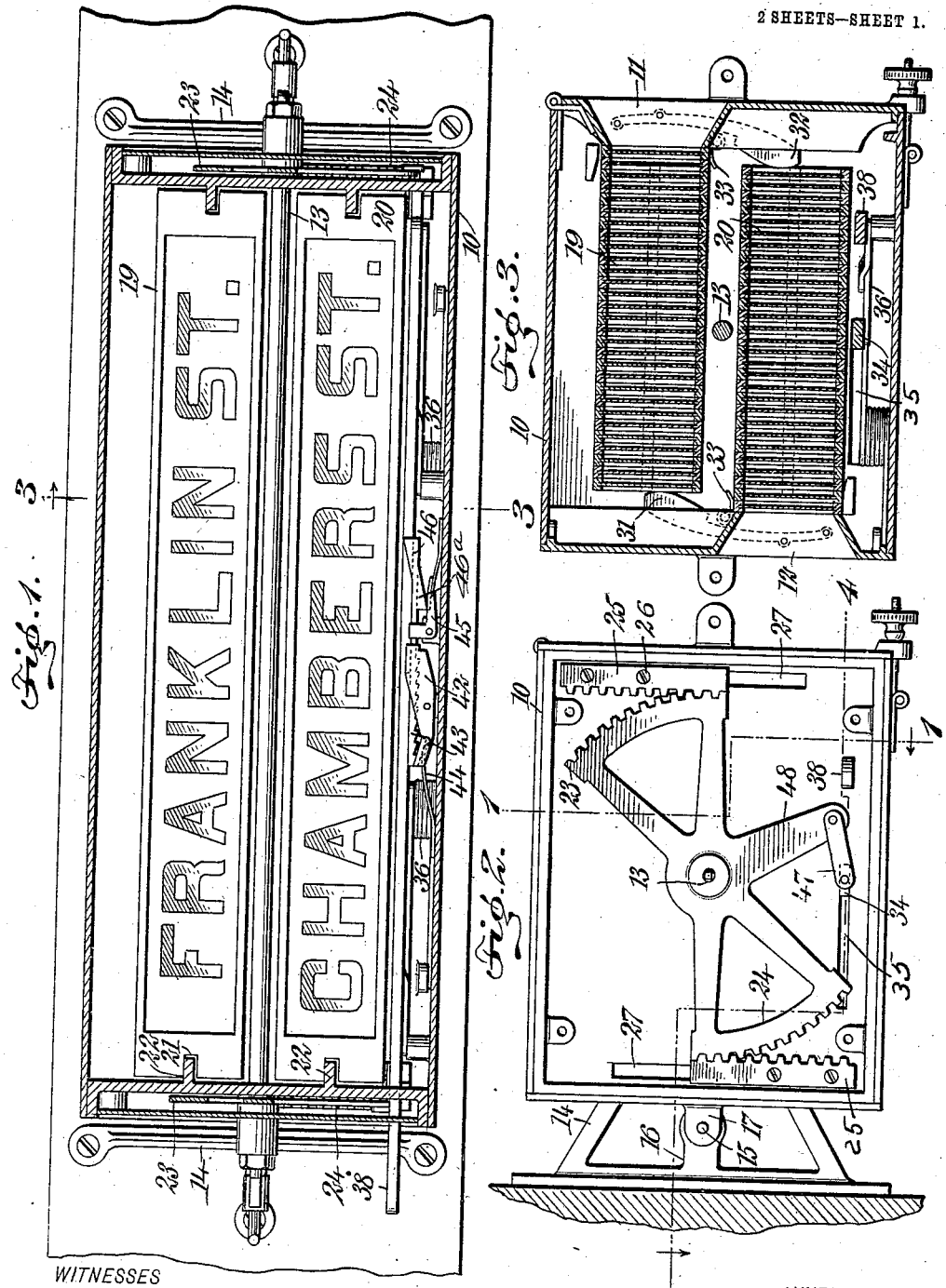

UNITED STATES PATENT OFFICE.

IRA OTIS THORLEY, OF PHILADELPHIA, PENNSYLVANIA.

ADVERTISING DEVICE.

No. 886,275.   Specification of Letters Patent.   Patented April 28, 1908.

Application filed December 15, 1906. Serial No. 348,035.

*To all whom it may concern:*

Be it known that I, IRA OTIS THORLEY, a citizen of the United States, and a resident of Philadelphia, in the county of Philadelphia and State of Pennsylvania, have invented a new and Improved Advertising Device, of which the following is a full, clear, and exact description.

This invention relates to improvements in advertising devices particularly adapted for use in cars for indicating stations or streets, the object being to provide a device of this character that will be simple in construction and in which are two sets of reversible or transferable slides bearing advertising matter, such for instance, as the names of streets or stations.

I will describe an advertising device embodying my invention and then point out the novel features in the appended claims.

Reference is to be had to the accompanying drawings forming a part of this specification, in which similar characters of reference indicate corresponding parts in all the views.

Figure 1 is a sectional view on the line 1—1 of Fig. 2, of an advertising device embodying my invention; Fig. 2 is an end view with the end of the casing removed; Fig. 3 is a section on the line 3—3 of Fig. 1; Fig. 4 is a section on the line 4—4 of Fig. 2; Fig. 5 is a section on the line 5—5 of Fig. 4; Fig. 6 is a side elevation of the mechanism for preventing the return of the operating bar before it has completed the full stroke, the bar being in the intermediate position; and Fig. 7 is a view similar to Fig. 6, but showing the parts in the position occupied when the bar is at the end of its stroke.

The device comprises a casing 10 containing a series of slides and having at one side a sight opening 11 and at the opposite side a sight opening 12 through which the slides may be observed, as will be hereinafter described, the sight openings being so arranged that when the casing is turned or reversed, one opening will be above the other.

Extended longitudinally through the casing is a shaft 13 which has bearings in brackets 14 attached to the wall of a car, or to a similar support, and the casing is held as adjusted by turning movement in the brackets, by means of pins 15 slidable in the brackets or in the central portions 16 thereof and adapted to engage in perforations formed in lugs 17 on the casing. These locking pins 15 are held yieldingly in engagement with the lugs by means of springs 18. Arranged in the casing are two sets of slides 19, 20, each slide comprising a frame having a slot at its ends, as indicated at 21, for receiving flanges 22 projecting inward from the end walls of the casing. One pair of flanges extends from what may be termed the rear wall of the casing and terminates inward of the front wall thereof, so that the slide may pass between the ends of said flanges and said front wall, while the other pair of flanges extends from the front wall and terminates inward of the rear wall, thus providing a space through which a slide may be moved. It is designed that, in passing along a street and approaching a corner, a slide shall be transferred from the upper set to the rear side of the lower set, and that the slide at the front end of the lower set shall be transferred to the rear side of the upper set.

As a means for transferring the slides I employ a shifting device consisting of two racks 23, 24 mounted on the shaft 13 and located in chambers on the ends of the casing. These racks engage with corresponding vertically movable racks 25 each of which has pins 26 passing through a slot 27 in the inner end wall of the casing and connecting with a sliding member in the form of a plate 28 carrying a pawl 29, the said pawl being pivoted to the plate and pressed forward by means of a spring 30 to engage its free end with the wall of the slide or notch in the end of the foremost slide, as indicated in Fig. 5. Of course, there will be a pawl at each end of each series of slides and when the segment rack device is turned, the lowermost slide will be moved upward to the rear of the uppermost series of slides, while the front slide of the upper series will be moved downward to the rear side of the lower series, so that streets or stations will be indicated upon the return trip by reversing the casing. The set of slides 19 is pressed forward by means of a spring 31 mounted in the casing and engaging at its free end with the rear slide of said set and the set of slides 20 is pressed forward by means of a similar spring 32. These springs are curved at the ends so that by the manipulation of the segment racks the pawls 29 will force a slide from one division to the other, and the end slides are yieldingly held in position by means of spring plates or holders 33 which will yield to permit the end slides to pass from one position to the other. The segmental racks 23 and 24 are provided with arms 48 and links 47 connected to a horizontally slidable bar 34, the ends of which project through slots 35 in the lower portion of the end walls of the casing and this bar 34 is pressed forward by means of springs 36. The bar 34 has link connections 37 with an operating bar 38 and from the links 37 auxiliary links 39 extend and have pins 40 projected into slots 41 formed in the operating bar. This operating bar at one end extends outward through an opening in the casing, as clearly illustrated in Fig. 4.

When the bar 38 is drawn outward the links 39 and the links 37 cause the bar 34 to move laterally, and by reason of the links 47 and the arm 48 of the segmental racks, the latter are caused to rotate a definite distance each time the bar 38 is pulled out. The racks 25 are moved longitudinally by the segmental racks, and as each is provided with means for engaging with one of the slides, they serve to move the slides in a lateral direction. Thus at each outward movement of the bar 38, a slide is moved from the front of the upper series to the rear of the lower series, and one from the front of the lower series to the rear of the upper. In order to insure the movement of the bar 38 to the limiting position and secure the full movement of the slides, the said bar is provided with a downwardly-extending rack 43 adapted to engage with the latch 42. The latch is provided with two lateral extensions $42^a$ and $42^b$ (see Fig. 4), one of which $42^a$ lies underneath the rack teeth and is adapted to be pressed upward into engagement with said teeth by the spring 44. The other extension $42^b$ rests upon the upper surface of the rack bar and is raised to move the opposite end out of engagement with the teeth when the cam 46 on the upper side of the rack bar passes beneath said extension and the bar 38 has reached its limiting position. The angle lever 45 which is pivoted adjacent the end of the latch 42 is normally pressed into engagement with the end of the latch by a suitable spring, but this engagement does not interfere with the free movement of the latch, when the opposite end thereof is engaged by the several teeth. When the latch is operated by the wedge 46, the angle lever 45 engages in a recess in the latch and holds it in such a position that it cannot engage with the teeth while the bar is being returned to its original position. In Fig. 4 of the drawings, the bar is shown in its innermost position, while in Fig. 6, the bar is shown moved outward a short distance. In Fig. 7, the bar 38 is shown moved outward to its limiting position and the wedge 46 in engagement with the latch 42 moves the latter out of engagement with the rack teeth and permits of its being held in this position by the angle lever 45. When the bar 38 is returned to its original position, a cam $46^a$ on the under side of the rack bar adjacent the ends of the teeth thereof, engages with a lateral projection $45^a$ on the angle lever 45 and depresses the outer end to free the opposite end from engagement with the latch.

Having thus described my invention, I claim as new and desire to secure by Letters Patent:

1. A device of the class described, comprising a casing, two sets of slides mounted therein, means adapted to engage with said slides for moving the same laterally, segment racks in engagement with said slide-operating means, a shaft on which the segment racks are mounted, arms extending from the segment racks, a bar slidable in the casing, springs for moving said bar in one direction, connections between said bar and the arms extending from the segment racks, a longitudinally movable operating bar having link connection with the first-mentioned bar, and means for limiting the longitudinal movement of the operating bar.

2. A device of the class described comprising a casing, two sets of slides mounted in the casing, each of said slides having a frame slotted at its ends, flanges in the end walls of the casing for engaging in said slots, the said flanges terminating inward of the sides of the casing, plates mounted to slide in the casing, pawls carried by said plates for engaging in the slots of the slides, racks attached to said plates, segment racks at the ends of the casing and engaging with the first-named racks, a shaft on which said segment racks are mounted, a spring-pressed bar having link connection with said segment rack, and an operating bar having link connection with said spring-pressed bar.

3. A device of the class described comprising a casing, two sets of advertising slides arranged in the casing, each of said slides being slotted at its ends, flanges in the ends of the casing for engaging the slots in said slides, the ends of said flanges terminating inward of the sides of the casing, sliding plates on the ends of the casing, spring-pressed pawls carried by the plates and adapted to engage with the slots of said slides, racks to which said plates are secured, segment racks engaging with the first-named racks, a shaft on which the segment racks are mounted, arms extended from the segmental racks, a bar slidable in the casing, springs for moving said bar in one direction, link connection between said bar and the arms extended from the segmental racks, a longitudinally slidable operating bar having link connection with the first-named bar, and means for limiting the longitudinal movement of the operating bar.

4. A device of the class described, comprising a casing, two sets of slides arranged therein, means adapted to engage with said slides for moving them laterally, segment racks for operating said slide-moving means, a shaft on which said segment racks are mounted, a bar movable longitudinally of the casing, a bar movable laterally of the casing, means for connecting said bars, and means for connecting said last-mentioned bar to said segments, whereby the longitudinal movement of the first-mentioned bar causes a lateral movement of the last-mentioned bar and a rotation of the segments.

5. A device of the class described, comprising a casing, two sets of slides arranged therein, means adapted to engage with said slides for moving them laterally, segment racks for operating said slide-moving means, a shaft on which said segment racks are mounted, a bar movable longitudinally of the casing, a bar movable laterally of the casing, means for connecting said bars, means for connecting said last-mentioned bar to said segments, whereby the longitudinal movement of the first-mentioned bar causes a lateral movement of the last-mentioned bar and a rotation of the segments, and means for preventing the return of said first-mentioned bar before it completes its full longitudinal movement.

In testimony whereof I have signed my name to this specification in the presence of two subscribing witnesses.

IRA OTIS THORLEY.

Witnesses:
J. E. DAVIES,
HARRY L. PEPPER.